May 24, 1966 — M. HAGENES — 3,252,632
MEASURING AND DISPENSING ATTACHMENT FOR A CONTAINER
Filed March 4, 1965 — 2 Sheets-Sheet 1
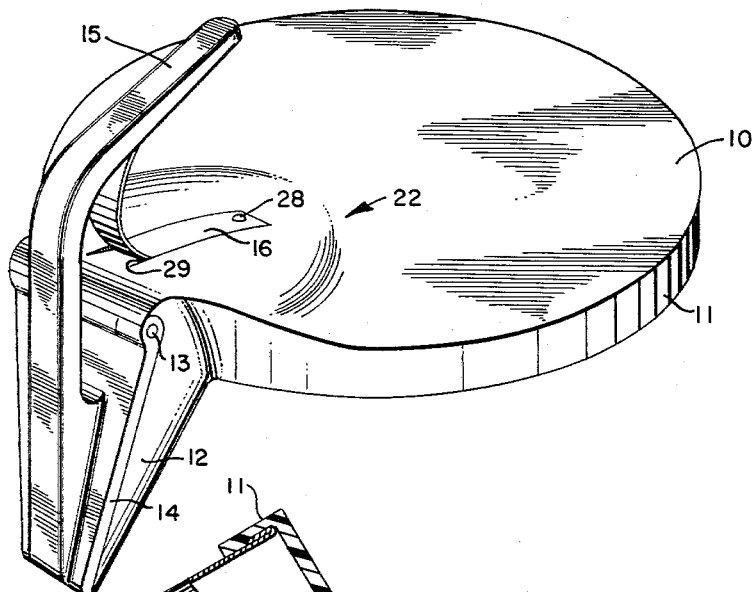
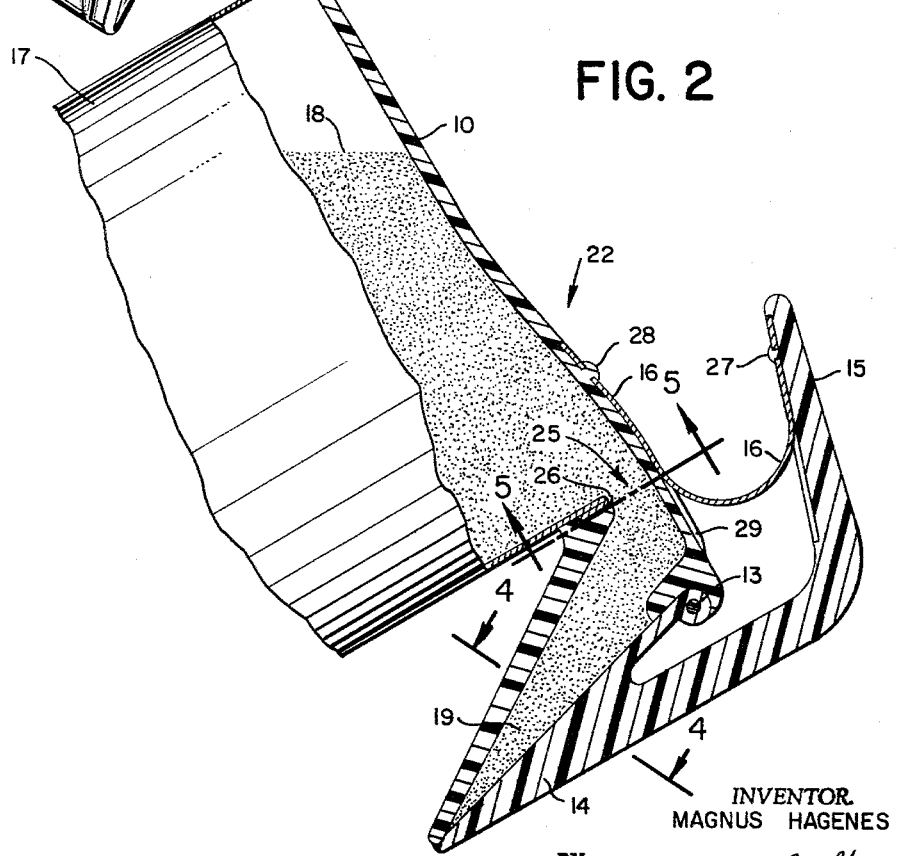
INVENTOR.
MAGNUS HAGENES
BY Nolte & Nolte
ATTORNEYS

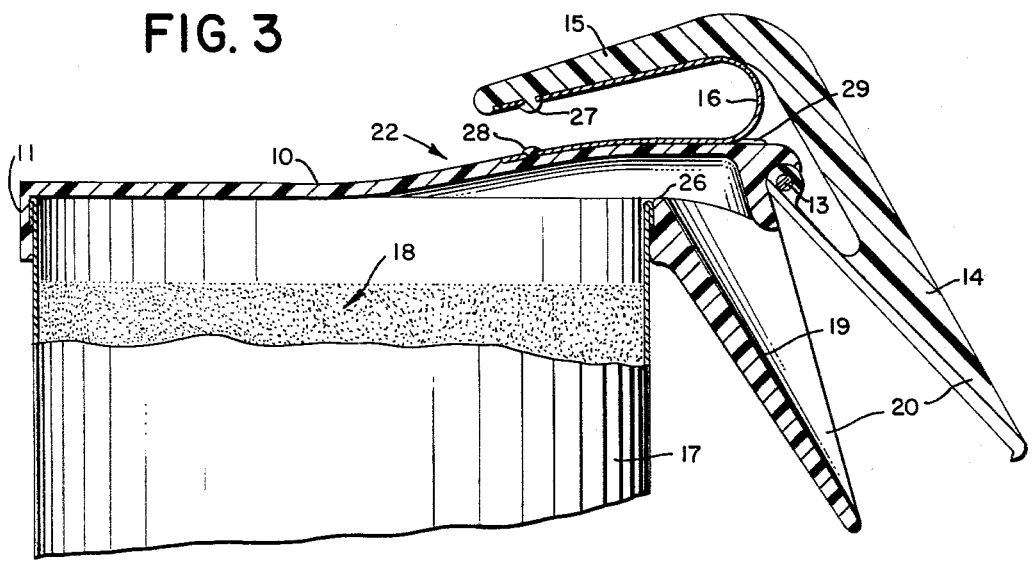
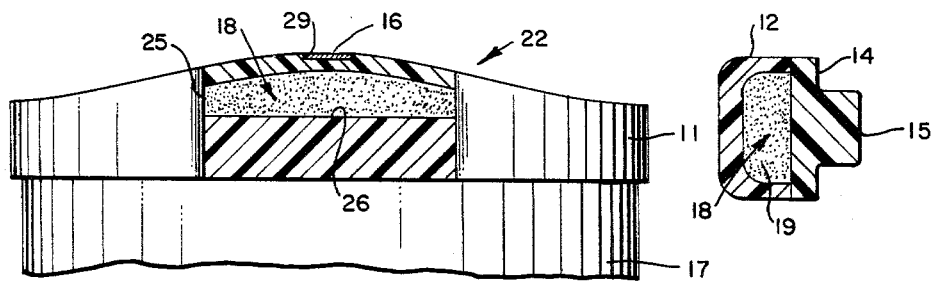

United States Patent Office 3,252,632
Patented May 24, 1966

3,252,632
MEASURING AND DISPENSING ATTACHMENT
FOR A CONTAINER
Magnus Hagenes, Pigeon Cove, Rockport, Mass.
Filed Mar. 4, 1965, Ser. No. 437,112
4 Claims. (Cl. 222—449)

This invention relates to a device for the measuring and dispensing of powdered granular material. More particularly, this invention relates to a device for the measuring and dispensing of a known quantity of powdered or ground coffee from a container.

Containers which are most widely distributed to the consumer for the distribution of either ground or instant coffee are generally hermetically sealed cans or bottles. One end of the container is usually removable so as to provide access to the container and its contents. It has been found that the continued opening and closing of that end of the container occurring during the normal use has the disadvantage of causing a considerable loss in the freshness, aroma and flavor of the contents within. Conventional coffee containers are provided with no means for measuring out a predetermined quantity of coffee to brew a single cup or plurality of cups of the beverage while still providing a seal to conserve the freshness, aroma and flavor of the contents remaining within.

The present invention has been particularly developed with the object of providing a removable dispenser which provides sealed closure while allowing the user to remove and dispense the produce in measured quantities. The present invention also has the advantage that the measuring and dispensing of the product may be performed without substantially exposing the product remaining within the container.

It is therefore one object of the invention to provide a novel measuring and dispensing device for a container of granular or powdered material.

It is another object of the invention to provide a measuring and dispensing device capable of preserving the contents stored within the container during normal use.

It is another object of the present invention to provide a measuring and dispensing device capable of measuring and dispensing a predetermined quantity of material stored within the container.

It is another object of this invention to provide a measuring and dispensing device that provides a means to rapidly and efficiently measure and dispense a predetermined amount of powdered or ground material from a container without spilling the material remaining in the container.

It is another object of this invention to provide a device for the measuring and dispensing of granular solids that is simple in construction and inexpensive to manufacture.

In accordance with the present invention the novel measuring and dispensing device is comprised of a flexible plastic lid and a pouring spout having a hollow chamber for receiving, measuring and dispensing a predetermined quantity of powdered material. The lid of the dispensing spout has been provided with a peripheral flange having either helical threads or a frictionally retaining surface so as to communicate with the opening at one end of the container and provide an effective seal for the contents within the container. The lid and its dispensing spout are preferably made of a plastic material which is not only flexible but which can be sterilized.

For further comprehension of the invention and of the objects and advantages thereof, reference will be had to the following description and accompanying drawings, and the appended claims in which the various novel features of the invention are more particularly set forth, wherein:

FIG. 1 is an oblique side and top view of the measuring and dispensing device according to the invention;

FIG. 2 is a cross-sectional view of the measuring and dispensing device shown in FIG. 1 and secured to one end of a container and showing the spout in a closed position;

FIG. 3 is a cross-sectional view of the measuring and dispensing device of FIG. 1 secured to a container wherein the spout has been opened for dispensing purposes;

FIG. 4 is a cross-sectional view of the section 4—4 of the spout in FIG. 2; and

FIG. 5 is a cross-sectional view of the section 5—5 of the spout in FIG. 2.

Referring to all of the drawings, the measuring and dispensing device according to this invention includes a circular lid 10 attached to a peripheral flange 11 designed to frictionally engage the open end of container 17. When the measuring and dispensing device is connected to the side walls at the open end of container 17, the retaining force produced by the resiliency of the material of the lid and its peripheral flange against the opening of container 17 provide a hermetic or fluid seal for the material stored within the container. A hollow tapered spout 12 is joined at one end to a segment of peripheral flange 11 of lid 10 and descends adjacent to and along the walls of container 17 and terminates along its other end in an outlet 20. A hollow chamber 19 is located within spout 12 intermediate the outlet 20 and the container opening 25 for receiving and measuring a predetermined quantity of material from the container.

A pivotable cover 14 is mounted by means of hinge 13 over the outlet of spout 12 to prevent the material retained within the spout from escaping. A push handle 15, an integral part of cover 14 extends over lid 10 to control the opening and closing of cover 14. A spring 16, located intermediate lid 10 and handle 15 provides a force against handle 15 to maintain cover 14 in a closed position.

Chamber 19 within spout 12 is a wedge-shaped or tapered trough having a volume corresponding to the exact quantity of material to be dispensed. When the container 17 is tilted sufficiently, the contents 18 within the container spill through the opening 25 into chamber 19. Opening 25 is formed in part by convex surface 22 on lid 10 disposed over chamber 19 of spout 12. One end of spring 16 is connected to the bottom of the extended end of handle 15. The other end is fastened to surface 22 to provide a retaining force against handle 15 to maintain cover 14 in a closed position.

After the container 17 has been tilted and a quantity of material 18 has spilled into chamber 19, the material in chamber 19 may be dispensed upon pressing handle 15 so as to cause cover 14 to pivot around hinge 13 to an open position. When the container is standing in an upright position, only that material which has been entrapped in chamber 19 will be dispensed from spout 12 when handle 15 is depressed.

When the material is dispensed from spout 12 it has a tendency to bridge or gap across the outlet of chamber 19. It is therefore a further object of this invention to provide the measuring and dispensing device with a resilient convex surface 22 which may be depressed inward against the material contained in chamber 19 due to the reaction of spring 16 when handle 15 is depressed. This additional force against the material retained within chamber 19 aids the force of gravity to overcome much of the surface tension and bridging effects that tend to withhold the material in the chamber after handle 15 is depressed and the spout is opened.

It is also within the scope of this invention to provide surface 22 with sufficient flexibility so that upon the depression of handle 15, spring 16 will collapse surface 22 against and across surface 26 so as to pinch closed and seal off the contents 18 within container 17 during the dispensing of materials from spout 12. This additional feature permits the measuring and dispensing device to dispense a predetermined amount of material, such as instant coffee, sufficient to make for instance, one cup of coffee, without exposing to the air the contents remaining within container 17 and thereby maintain and preserve the freshness, aroma and flavor of those contents.

The preferred design of the measuring and dispensing device has been constructed for simple, low cost manufacturing and using a minimum amount of labor and parts. The lid portion containing spout 12 consists of a one piece molded flexible plastic construction. The cover portion 14 and its integrally connected handle 15 consist a one piece molded plastic construction and is designed to engage lid 10 at hinge 13. The underside of handle 15 contains a small projection 27 located along its extended end for receiving, positioning and securing spring 16 through a hole at one end. A hole is provided at the opposite end of spring 16 to receive projection 28 contained on surface 22 so as to likewise secure the spring at its other end to the lid. Surface 22 also contains a channel 29 corresponding to the thickness and width of spring 16 to additionally secure the spring to surface 22. It is thus possible to assemble the entire device from three pieces by fastening cover 14 onto hinge 13 along the periphery of lid 10 and engage flexible spring 16 intermediate handle 15 and surface 22 of lid 10, both rapidly and simply with a minimum amount of manufacturing effort.

It is also possible to simplify further the construction of the measuring and dispensing device by eliminating push-spring 16 and allow handle 15 to contact resilient surface 22 either directly or through an interconnecting support so that the spring-like resiliency of surface 22 is employed to maintain cover 14 in a closed position over the outlet of spout 12.

The measuring and dispensing devices according to this invention can be manufactured and installed on both cans and bottles by the conventional mass production by plastic forming and assembling machinery at very low cost. They afford the consumers a great service and satisfaction in the use of ground and instant coffee packaged in both cans and bottles. The invention is applicable to the packaging of not only coffee but also for the packaging and dispensing of tea, sugar, and other granular products. The specific embodiment of the invention illustrated and described above is to be understood not to limit the precise construction of the invention and various changes and modifications may be made within the scope of the invention as defined in the appended claims.

I claim:
1. A device having an open and closed position for measuring and dispensing a known quantity of a powdered or granular material from a container comprising;
   a lid having a peripheral flange for frictionally engaging the sidewall forming the opening of the container,
   a hollow tapered spout joined at one end to the peripheral flange of said lid and descending adjacent to and along the walls of said container and terminating at its other end in an outlet, said spout having a hollow chamber within communicative with said container and said outlet for receiving and measuring a predetermined quantity of material,
   a pivotally mounted cover joined to said spout and providing a seal over said outlet when in said closed position,
   a flexible concave surface integrally joined to said lid surface and disposed over said hollow chamber,
   a push-handle joined to said cover and extending over and in contact with said concave surface, said concave surface having sufficient resiliency to urge said cover against said outlet when said spout is in its closed position, and when said handle is depressed, to provide for said open position by permitting said handle to simultaneously depress said surface inward to partially collapse said hollow chamber and open said cover over said outlet.

2. A device having an open and closed position for measuring and dispensing a known quantity of a powered or granular material from a container comprising; a lid having a peripheral flange for frictionally engaging the sidewall forming the opening of a container, a hollow tapered spout joined at one end to the peripheral flange of said lid and descending adjacent to and along the walls of said container and terminating at its outer end in an outlet, said spout having a hollow chamber within communicative with said container and said outlet for receiving and measuring a predetermined quantity of material, the outlet of said spout being a tapered trough extending along one of the descending surfaces thereof, a pivotally mounted cover joined to said spout and providing a seal over said outlet, when in said closed position, a press-handle joined to said cover and extending over the top surface of said lid, and a retaining means for maintaining said cover in a normally closed position.

3. A device as recited in claim 2, wherein said retaining means comprises a push spring secured intermediate said handle and said surface, and said lid includes a flexible convex surface disposed over said hollow chamber, wherein said push spring is secured to said convex surface so that when said handle is depressed to open said outlet said convex surface is depressed against the material retained within said spout.

4. The device as recited in claim 3 wherein the depression of said handle during the opening of said spout depresses said convex surface against said peripheral flange to separate and seal said hollow chamber from the material within said container.

References Cited by the Examiner

UNITED STATES PATENTS

| 1,438,892 | 12/1922 | Boykin | 222—454 X |
| 2,385,195 | 9/1945 | Clower | 222—456 X |
| 2,739,741 | 3/1956 | Barnett | 222—455 |
| 3,157,322 | 11/1964 | Bernhardt | 222—517 |

FOREIGN PATENTS

| 827,688 | 2/1960 | Great Britain. |

LOUIS J. DEMBO, *Primary Examiner.*

HADD S. LANE, *Examiner.*